(12) United States Patent  
Roberts et al.

(10) Patent No.: US 8,249,240 B2  
(45) Date of Patent: ***Aug. 21, 2012

(54) SYSTEMS AND METHODS FOR PROVIDING SELECTABLE OPTIONS TO A CALLING PARTY ON-HOLD

(75) Inventors: Linda Ann Roberts, Decatur, GA (US); Edward Michael Silver, Atlanta, GA (US); Hong Thi Nguyen, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 814 days.

This patent is subject to a terminal disclaimer.

(21) Appl. No.: 12/202,155

(22) Filed: Aug. 29, 2008

(65) Prior Publication Data

US 2009/0180601 A1 Jul. 16, 2009

Related U.S. Application Data

(63) Continuation of application No. 09/957,760, filed on Sep. 21, 2001, now Pat. No. 7,426,266.

(51) Int. Cl.
*H04M 3/42* (2006.01)

(52) U.S. Cl. ........... 379/215.01; 379/201.01; 379/88.05; 379/88.06

(58) Field of Classification Search ............... 379/88.05, 379/88.06, 201.01, 215.01
See application file for complete search history.

(56) References Cited

U.S. PATENT DOCUMENTS

| | | | | |
|---|---|---|---|---|
| 5,953,401 | A * | 9/1999 | Caveney | 379/211.01 |
| 6,400,804 | B1 * | 6/2002 | Bilder | 379/76 |
| 6,459,774 | B1 * | 10/2002 | Ball et al. | 379/67.1 |
| 7,136,475 | B1 * | 11/2006 | Rogers et al. | 379/213.01 |
| RE39,722 | E * | 7/2007 | Hansen et al. | 379/88.25 |
| 2001/0012335 | A1 * | 8/2001 | Kaufman et al. | 379/67.1 |

* cited by examiner

*Primary Examiner* — Quynh Nguyen
(74) *Attorney, Agent, or Firm* — Greenblum & Bernstein, P.L.C.

(57) ABSTRACT

Systems and methods are disclosed for providing selectable options to a calling party while the calling party is on hold. A call from the calling party is received and the calling party is placed on hold. While on hold, the calling party is provided with a plurality of selectable options. Each of the plurality of options corresponds to a predefined operation. A selected option request, corresponding to one of the plurality of options, is received from the calling party. The predefined operation corresponding to the selected option request is then performed. A system is also provided having instructions thereon for providing selectable options to a calling party while on hold.

19 Claims, 5 Drawing Sheets

SYSTEMS AND METHODS FOR PROVIDING SELECTABLE OPTIONS TO A CALLING PARTY ON-HOLD

RELATED CASES

This application is a continuation of U.S. patent application Ser. No. 09/957,760 entitled SYSTEMS AND METHODS FOR PROVIDING SELECTABLE OPTIONS TO A CALLING PARTY ON-HOLD filed on Sep. 21, 2001 now U.S. Pat. No. 7,426,266, which is hereby incorporated by reference in its entirety.

FIELD OF THE INVENTION

The present invention relates generally to telecommunications. More particularly, the present invention relates to systems and methods for providing selectable options to an on-hold calling party.

BACKGROUND OF THE INVENTION

Virtually everyone who uses a telephone is familiar with being put on hold when trying to reach a called party. Whether calling a restaurant, a mail-order business or the like, it is a common practice for the called party to place the calling party on "hold" when the called party is too busy to immediately answer the call. "Hold" is, in the telephone sense, a limbo-like state where the call from the calling party is suspended until the called party answers the call. Typically, after placing the calling party on-hold, the called party provides a sedate music selection or advertisement pitch for the calling party to listen to while the calling party waits for the called party to answer the line.

Unfortunately for the calling party, the only option after being placed on-hold is to wait until the called party answers (and, in the meantime, listen to whatever music or other information the called party provides) or to hang up the phone and try calling back later. Frequently, the calling party will become impatient, waiting for the called party to return to the telephone. The wait on hold usually seems much longer than it really is. In this manner, the calling party can get a sense that his time is being wasted. Additionally, the calling party can feel helpless, as the only options available to him are to wait or to hang up and try again later. In this sense, the wait on hold is not a very meaningful or valuable experience for the calling party.

It would be advantageous to both called parties that place calling parties on hold, as well as to the calling parties themselves, if systems and methods were provided whereby the calling party could have more control over the "on-hold" experience. Such systems and methods would be particularly advantageous if they occupied the calling party during the time he is on hold and, thereby, made the wait on hold seem valuable, or at least less wasteful. Consequently, there is a need for systems and methods that provide an "on-hold" calling party with selectable options that allow the calling party to control the on hold experience.

BRIEF SUMMARY OF THE INVENTION

The present invention satisfies the aforementioned need by providing selectable options to an on-hold calling party. In this manner, the on-hold calling party can select from various selectable options while waiting for the called party to answer the call. For example, the calling party may select from options that include listening to various audio segments, such as music or current events, or options that perform call dispositions operations. In this manner, the duration of time the calling party is on-hold may seem shorter because the calling party can choose what to listen to while on-hold or how to dispose of the call.

The invention provides systems and methods for providing an on-hold calling party with selectable options. In this manner, a call is received from the calling party and the calling party is placed on hold. While on hold, the calling party is provided with a plurality of options, each of the plurality of options is associated with a predefined operation such as providing an audio segment or call disposition operation. Then, a selected option request, corresponding to one of the options, is received from the calling party and the predefined operation associated with the selected option request is performed.

BRIEF DESCRIPTION OF THE SEVERAL VIEWS OF THE DRAWING

Other features of the present invention are further apparent from the following detailed description of the embodiments of the present invention taken in conjunction with the accompanying drawings, of which.

DETAILED DESCRIPTION OF THE INVENTION

Overview of an Exemplary Telephone Network

Referring now to the figures, an embodiment of the systems and methods of the present invention will be described. Basic telephony concepts and terminology are used throughout the description as would be understood by one of skill in the art.

Figure 1:
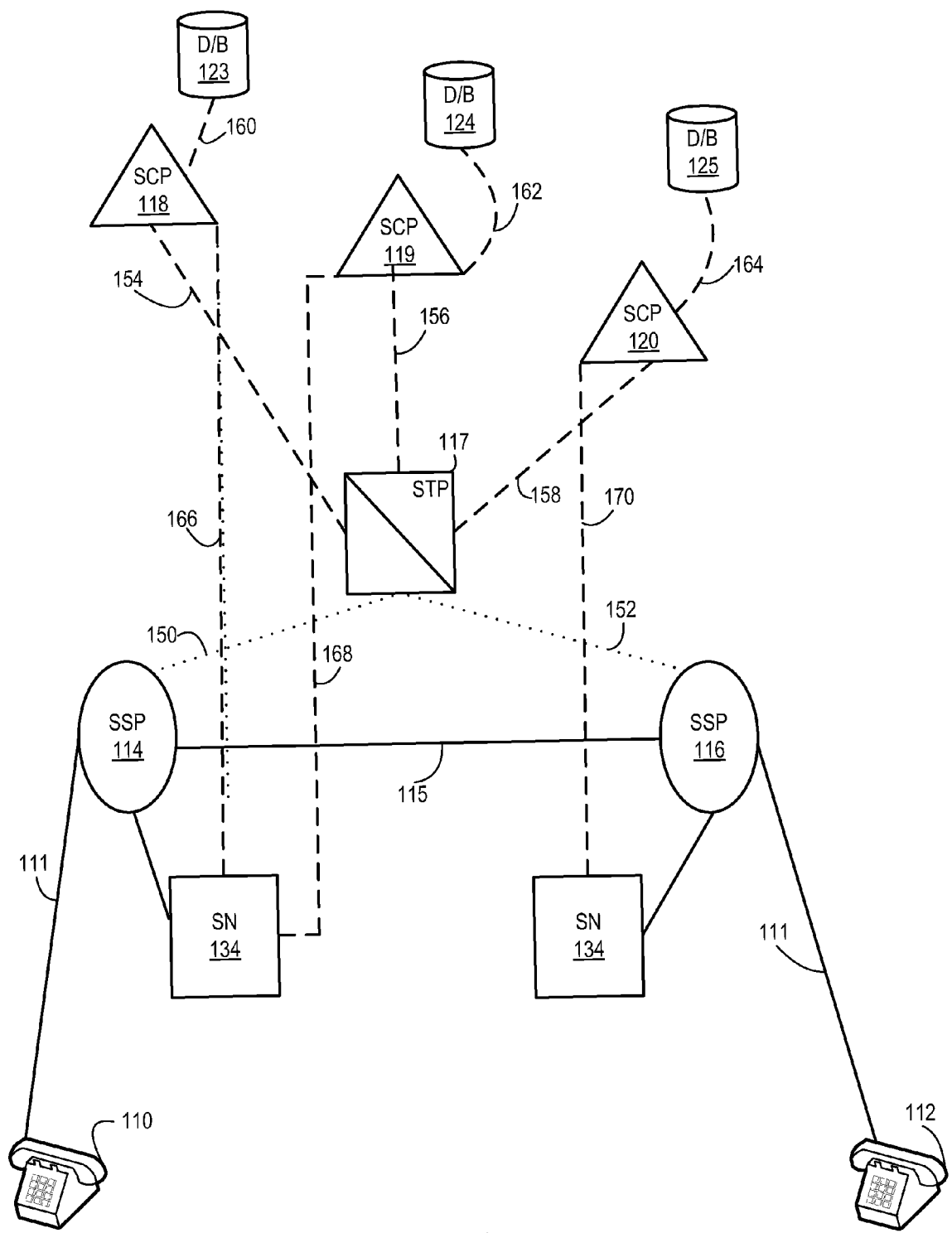
FIG. 1 illustrates, in general block diagram form, an Advanced Intelligent Network (AIN) based system in which the present invention may be embodied.

Referring now to FIG. 1, there is shown an exemplary telecommunications network in which the present invention may embodied. This exemplary environment is the public switched telecommunications network (PSTN). A portion of the PSTN is illustrated in FIG. 1 and is generally described below.

AIN systems are described in U.S. Pat. No. 5,701,301, which is incorporated herein by reference in its entirety. In particular, an AIN network with advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

FIG. 1 illustrates a simplified AIN-based network arrangement that may include the various features of the invention, as further described below. The AIN includes a variety of interconnected network elements. A group of such network elements includes a plurality of central offices (COs) or service switching points (SSPs) 114, 116 capable of generating AIN queries. A central office or SSP is basically a switch and the terms are used interchangeably herein. SSPs 114 and 116 may comprise, for example, DMS100 or 5ESS switches. These switches may be manufactured by, for example, Lucent Technologies, Inc. or Nortel Networks.

As further illustrated in FIG. 1, SSPs 114, 116 have a plurality of subscriber lines 111 connected thereto. Subscriber lines 111 may also be referred to as calling lines. Each SSP 114, 116 serves a designated group of calling lines, and thus, the SSP or switch that serves a particular calling line may be referred to as its serving switch. Each calling line 111 typically is connected to a piece of terminating equipment including a plurality of telephones designated, e.g., as 110, 112. Although telephones are illustrated as the pieces of terminating equipment in FIG. 1, those skilled in the art will understand that such pieces include other telecommunication devices such as facsimile machines, computers, modems, etc.

Referring again to FIG. 1, SSPs 114, 116 are interconnected by a plurality of trunk circuits 115. These are the voice path trunks that interconnect SSPs 114, 116 to connect communications. The term "communication" or "call" is used herein to include all messages that may be exchanged between caller and called party in the network illustrated in FIG. 1. Trunk 115 may be either a Signaling System 7 (SS7) controlled multi-frequency trunk (MF), or primary rate interface (PRI) trunk or the like. The type of trunk will be in accordance with both the sending and receiving SSP to which it is connected.

In the example shown in FIG. 1, each SSP 114, 116 may include different types of facilities and/or triggers. SSPs 114 and 116 are each programmable switches which may perform the following functions: recognize AIN-type calls, launch queries, and receive commands and data to further process and route AIN-type calls. When one of SSPs 114 or 116 is triggered by an AIN-type call, the triggered SSP 114 or 116 formulates and sends an AIN query. Based on the reply from the AIN network, SSP 114 or 116 responds to call processing instructions received.

Each of SSPs 114 and 116 is connected to a signal transfer point (STP) 117 via respective data links 150, 152. In one embodiment, these are data links employing a signaling protocol referred to as SS7, which is well known to those skilled in the art. It should be understood, however, that any suitable signaling protocol may be employed without departing from the spirit and scope of the invention. In order to facilitate signaling and data messaging, each SSP 114 and 116 may be equipped with Common Channel Signaling (CCS) capabilities, e.g., SS7, which provides two-way communications of data messages over CCS links 150 and 152 between components of the AIN network. The data messages may be formatted in accordance with the Transaction Capabilities Applications Part (TCAP). Alternatively, Integrated Service Digital Network (ISDN) Users Part (ISUP) may be used for signaling purposes between, for example, SSPs 114 and 116. In such a case, SSPs 114 and 116 may be equipped with the capability to map appropriate data between TCAP and ISUP protocols, and vice versa. The telephone network basically employs an upper-level software controlled network through the STPs and the SCP.

Accordingly, the connections by links 150, 152, 154, 156, and 158 are for signaling purposes and allow SSPs 114 and 116 to send messages to and to receive messages from SCP 118, 119 and 120. One skilled in the art will further recognize that the above-described network is a simplified network meant for explanatory purposes. It is likely that a telephone network may comprise numerous user stations, SSPs, STPs, SCPs, and SNs along with other telephone network elements and may employ other types of triggers without departing from the spirit and scope of the invention.

AIN SSPs 114 and 116 may allow normal switch processing to be suspended at specific points in a call so that the switch may send an AIN message query via signaling transfer point (STP) 117 to SCP 118, 119 or 120. SCP 118, 119 or 120 may execute software based service logic and return call-processing instructions to the triggering AIN SSP. New services may be provisioned by assigning AIN SSP triggers to customer lines, trunks, and/or NANP (North American Numbering Plan) telephone numbers.

Much of the intelligence of the AIN resides in a type of AIN element referred to as a service control point (SCP) 118, 119, 120 that is connected to STP 117 over an SS7 data link, or the like, 154, 156 or 158. Among the functions performed by SCP 118, 119, 120 is the hosting of network databases and subscriber databases, which may be stored in respective data storage objects 123, 124, 125. For example, data storage object 123 is shown as a database communicatively coupled to SCP 118, although data storage object 123 may be embodied as a component within SCP 118, such as an internally-mounted hard disk device. The databases stored in data storage object 123 may be used in providing telecommunications services to a customer. Typically, SCP 118, 119, 120 is also the repository of service package applications (SPAs) that are used in the application of telecommunication services, enhanced features, or subscriber services to calling lines. Additionally, SPAs may use databases for providing telecommunication services.

A set of triggers may be defined at the SSPs 114, 116. A trigger in the AIN is an event associated with a particular call that initiates a query to be sent to SCP 118, 119 or 120. The trigger causes selected SCP 118, 119 or 120 to access, if necessary, its respective database 123, 124 or 125 for processing instructions with respect to the particular call. The results of the SCP processing and/or database inquiry is/are sent back to selected SSP 114 or 116 in a response through STP 117. The return packet includes instructions to SSP 114, 116 as to how to process the call. The instructions may be to take some special action as a result of a customized calling service, enhanced feature, or subscriber service. In response, switch 114, 116 moves through its call states, collects the called digits, and generates further packets that are used to set up and route calls. Similar devices for routing calls among various local exchange carriers are provided by regional STP and regional SCP.

An example of such a trigger is a termination attempt trigger (TAT), which causes a query to be sent to SCP 118, 119 or 120 whenever an attempt is made to terminate a call on the line of subscriber 110 or 112. Another type of trigger that may be used is a Public Office Dialing Plan (PODP) trigger but it should be understood that the spirit and scope of the invention encompass the use of other triggers.

The AIN may also include a services circuit node 134 (SCN), which may also be referred to herein as a services node (SN). SN 134 is an interactive data system that acts as a switch to transfer calls. SN 134 may provide interactive help, collect voice information from participants in a call, and/or provide notification functions. SN 134 may be a Lucent Technologies Star Server FT Model 3200 or Model 3300 although other devices may be employed without departing from the scope of the invention. SN 134 may include voice and dual tone multi-frequency (DTMF) signal recognition devices and/or voice synthesis devices. In addition, SN 134 may include a data assembly interface. SN 134 may be connected to local SCP 118, 119, 120 via respective data links 166, 168, 170 using an X.25, SS7 or TCP/IP protocol or any other suitable protocol. In addition, SN 134 typically may be connected to one or more (but usually only a few) SSPs via Integrated Service Digital Network (ISDN) lines or any other kind of suitable telephone lines.

DETAILED DESCRIPTION OF THE PRESENT INVENTION

The present invention provides systems and methods for providing an on hold calling party with selectable options. Such options may enable the calling party to listen to audio segments, such as, different types of music, current events, the local weather or the like or the options can be certain call disposition functions such as directing the calling party to a voice mailbox or to an operator. It is appreciated that at anytime while the calling party is on hold, the called party may interrupt the calling party and answer the call.

Figure 2:
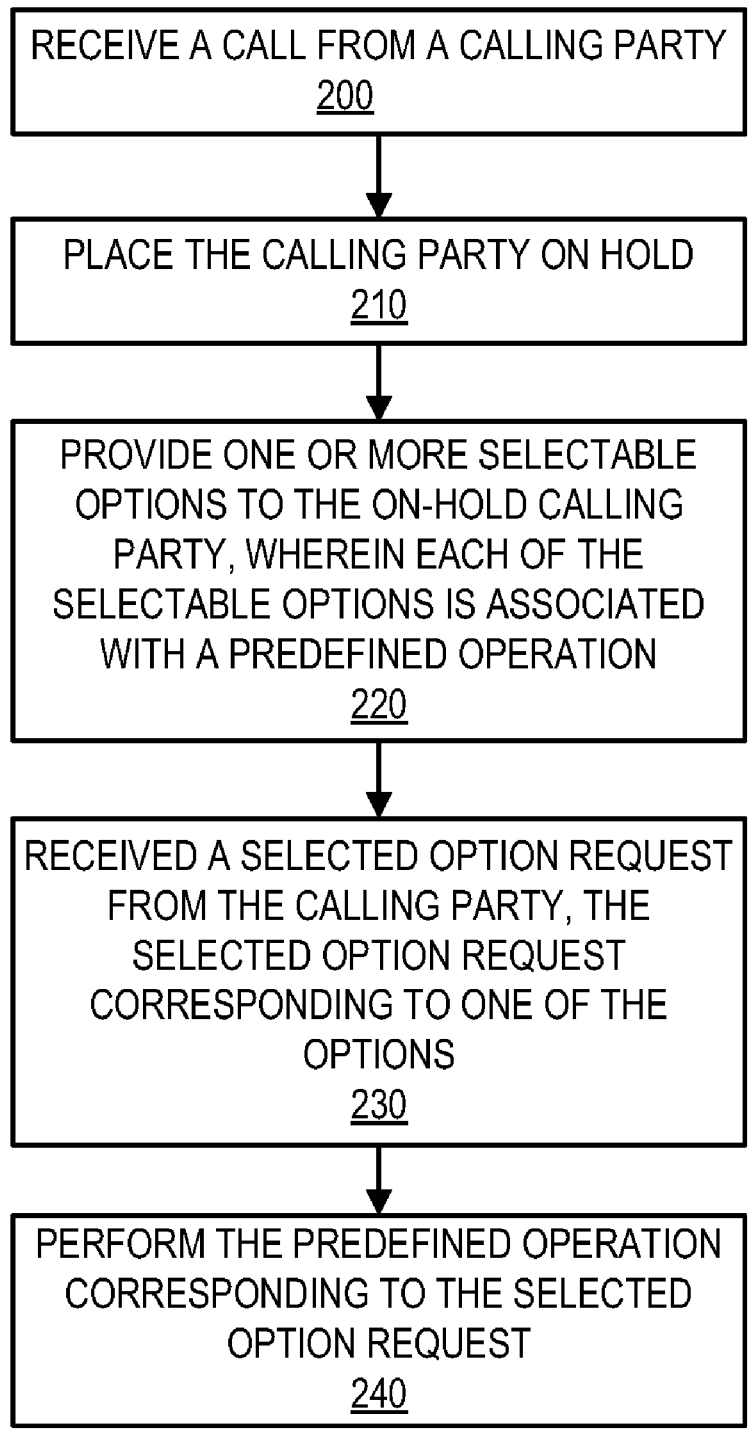
FIG. 2 is a flowchart illustrating a method for providing selectable options to a calling party while on hold in accordance with the present invention.

FIG. 2 is a flowchart illustrating a method in accordance with the present invention for providing selectable options to an on-hold calling party. Typically, a calling party places a telephone call ("call") by dialing a called party's unique telephone number. Then, at step 200, the called party's telephone system receives the call.

At step 210, the called party places the calling party on hold. For example, the calling party may be placed on hold because the called party is on another line or the calling party is not currently available to take the call. For whatever reason, in accordance with the present invention, at step 220, the called party's telephone system presents one or more options to the on-hold calling party. Each of the options is each associated with a predefined operation. For example, in one embodiment of the invention, the predefined operation is providing audio to the on-hold calling party. In this manner, the calling party is presented with options that either allow the calling party to continuously listen to a preferred music type until the calling party is removed from hold or allows the calling party to listen to a selected audio segment. For example, the audio segments can include songs, music, or information such as the local weather, traffic reports, area restaurants, or the like. Additionally, the audio segments can be information segments that provide information relating to the called party such as, for example, directions to address of the called party, recent news concerning the called party, or the like.

Alternatively or additionally, the predefined operation can be a call disposition operation. In this manner, the on-hold calling party is presented with one or more options that allow the calling party to dispose of the call. For example, call disposition operations can include directing the calling party to a voice mailbox or to an operator or the like.

In any event, after being presented with the available options, the calling party selects an option and, thereby, sends a selected option request to the called party. In one embodiment of the present invention, the calling party can send the selected option request to the called party using a voice command. In this manner, the calling party can voice the option number the calling party wishes to select. In another embodiment of the present invention, the calling party sends the selected option request to the called party using a touch tone command. In this manner, the calling party can press the numbered key on the telephone keypad that corresponds to the option number the calling party wishes to select.

At step 230, the called party's telephone system receives the selected option request from the calling party. At step 240, the called party's telephone system causes the predefined operation that corresponds to the selected option request to be performed. For example, if the calling party selects an option for listening to an audio segment playing classical music, then classical music will be audibly provided to the calling party. Similarly, if the calling party selects an option to be directed a voice mailbox, then the calling party is directed to the voice mailbox.

In one embodiment of the present invention, an option can be to continuously listen to audio until the calling party is removed from hold. In this manner and for example, the calling party selects an option to listen to continuous audio of a certain type of music, and listens to the selected audio until the calling party is removed from hold. For example, if the calling party selects a continuous jazz music option, then jazz music is continuously provided to the calling party until the calling party is removed from hold. It is also contemplated that providing continuous audio may be a default selection in the event the calling party does not select an option.

In another embodiment of the present invention, the calling party can listen to one or more discrete audio segments. In this manner, the calling party can make a selected option request and listen to a discrete audio segment. Then, once the discrete audio segment is over, the calling party is presented with a second plurality of options where each of the second plurality of options is associated with a respective predefined operation. Then, the calling party makes a second selected option request that corresponds to one of the second plurality of options and the second request is received by the called party and performs the predefined operation associated with the second selected option request. For example, after listening to one audio segment, such as a music song, the calling party can then choose to listen to another audio segment or can chose to be directed to voice mail or the like.

In another embodiment of the present invention, after receiving a selected option request at step 230, the calling party can be asked to input data associated with the selected option and then the operation is performed based on the inputted data. In this manner and for example, the user can select an option that enables the calling party to listen to the local weather. In order to determine the local weather, however, the calling party's geographic location is needed. In one embodiment of the present invention, the calling party can be asked to enter data reflective of the calling party's city, state, zip code or the like. Alternatively, in other embodiments, any suitable information can be used such as, for example, the calling party's telephone number to determine the calling party's geographic location without departing from the scope of the present invention. In any event, once the geographic information is received, the weather corresponding to that location can be found. For example, in one embodiment of the present invention, the called party's telephone system connects to a website on the Internet, for example, and retrieves an audio file containing weather information corresponding to that location. Such retrieval can include requesting a search for the weather information, or any other such techniques as are known in the art. The calling party's telephone system then provides an audible representation of the retrieved weather information to the calling party.

In another embodiment of the present invention, the calling party can be presented with at least one option that allows the calling party to activate a call disposition operation to dispose of the call. In this manner, at step 220, the calling party is presented with at least one such option while on hold. For example, the calling party can be presented with options that allow the calling party to connect to an operator or to a called party's voice mail or similar answering service. This allows the calling party to control the duration the calling party is on hold. In this regard and for example, the calling party may wish to leave a message for the called party after waiting on hold for some time, consequently, the calling party may select an option which would direct the calling party to the called party's voice mailbox.

It is appreciated that the calling party may return to the menu of selectable options while listening to any audio segment. In this regard and for example, the calling party may stop listening to an audio segment by pressing the "#" key on the telephone keypad and execute a call disposition function, such as, be directed to a voice mailbox. As such, while listening to an audio segment, the calling party may interrupt the audio segment and return the selectable options menu to select an option that will direct the calling party a voice mailbox.

Figure 3:
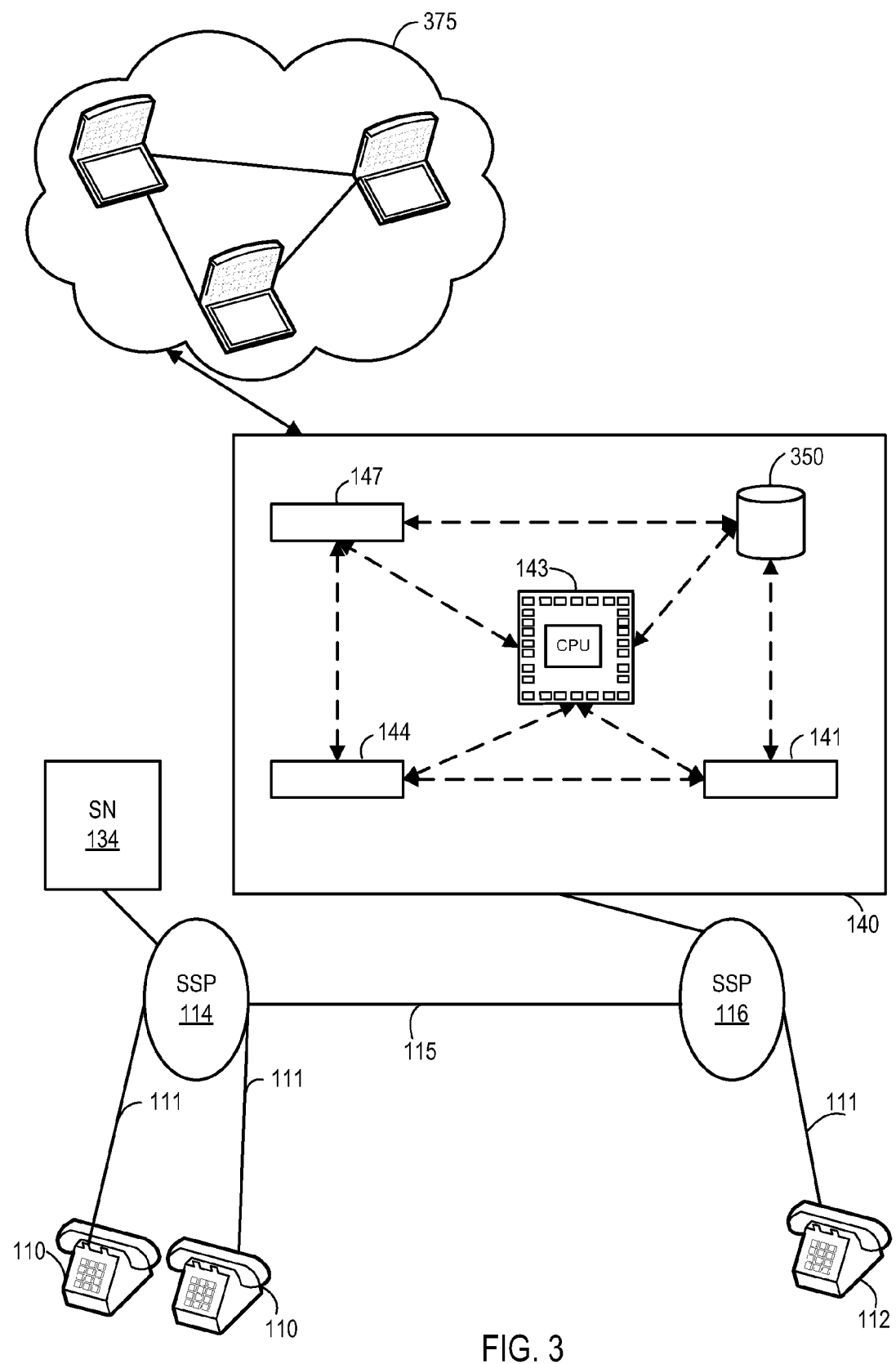
FIG. 3 illustrates, in general block diagram, a portion of an exemplary Advanced Intelligent Network (AIN) based system according to the principles of the present invention.

FIG. 3 is a block diagram of a portion of an exemplary AIN based telephone system in which the present invention may be embodied. For illustration purposes, as seen in FIG. 3, the present invention can be embodied in a service node 140 of an AIN based telephone system. The present invention can be, however, implemented in other components of an AIN based telephone network or in any other telephone network or system. Consequently, the present invention should not be construed to be limited to AIN based systems.

A calling party (not shown) uses telephone 110 to call a called party at telephone 112 through subscriber lines 111, SSP 114, trunk line 115, and SSP 116. Telephone 112 is connected to service node 140 through SSP 116. In particular, the service node 140 in accordance with the present invention includes a computer-readable medium having computer-executable instructions thereon for performing a method according to the invention. In one embodiment, the SN 140 receives a call from the calling party and connects the call to the called party's telephone. The SN 140 causes the calling party to be placed on hold at the calling party's command. The SN 140 provides one or more selectable options to the on-hold calling party. Each of the selectable options is associated with a predefined operation. The SN 140 receives from the calling party, a selected option request that corresponds to one of the options, and causes the predefined operation associated with the selected option request to be performed.

In particular, the service node 140 can include interconnected elements such as a hold platform 144, a data store 350, a hold manager 141, and an operations manager 147. Hold platform 144 is adapted to hold at least one calling party on hold. Additionally, the service node 140 includes a hold manager 141 in communication with the hold platform 144. Hold manger 141 is adapted to provide a plurality of options to the on-hold calling party in the hold platform 144 and to receive a selected option request selected by the calling party that corresponds to one of the plurality of options from the on-hold calling party. In one embodiment of the present invention, the hold manager 141 accesses internal data store 350 to retrieve the options to provide to the calling party.

The service node 144 also includes an operations manager 147 for performing the predefined operation associated with the selected option request. Specifically, and for example, if the selected option request is to listen to audio, the operations manager 147 may access internal data store 350 to retrieve audio files to play to the calling party. In another embodiment of the present invention, the operations manager 147 access an external computer network 375, such as the Internet, for example, and retrieve audio files to provide to the calling party. For example, if the calling party selects an option to listen to audio information concerning the weather, the operations manager may access an Internet website having weather information and subsequently provide the audible weather information to the calling party.

Service Node 140 can also include a microprocessor 143 in communication with memory or database 350 or network 375. The microprocessor processes instructions and various voice or touch tone commands received from the calling party at telephone 110. Internal database 350 stores the selectable options and associated audio segments or call disposition functions to be provided to the calling party. The memory 350, however, need not be contained in the same location as the processor. For example, the selectable options and associated audio segments and disposition functions may be stored in a separate machine or network such as for example, the World Wide Web.

Figure 4A:
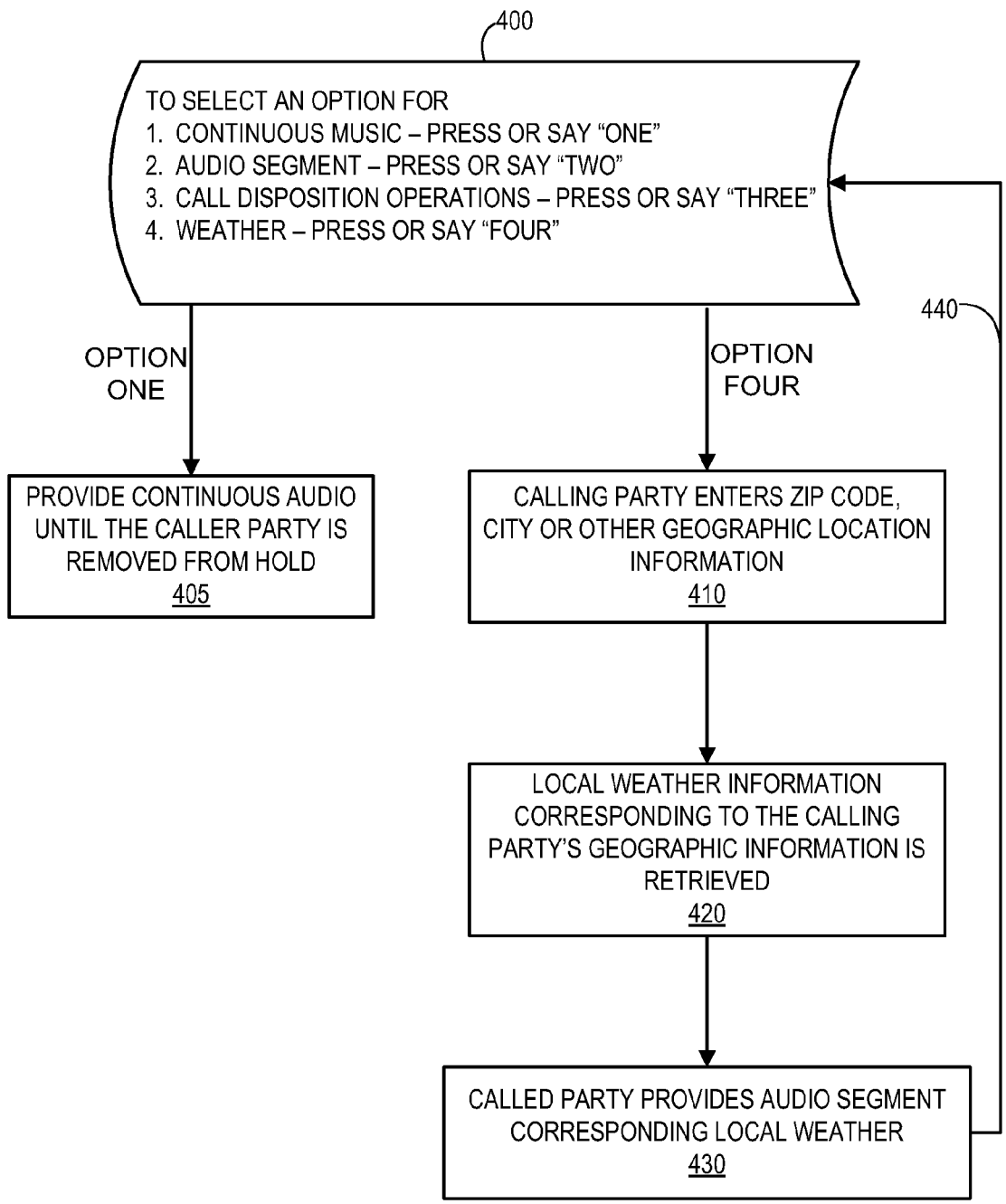
FIGS. 4A and 4B are flowcharts of a method according to the invention, in which an exemplary selectable options menu is illustrated.
Figure 4B:
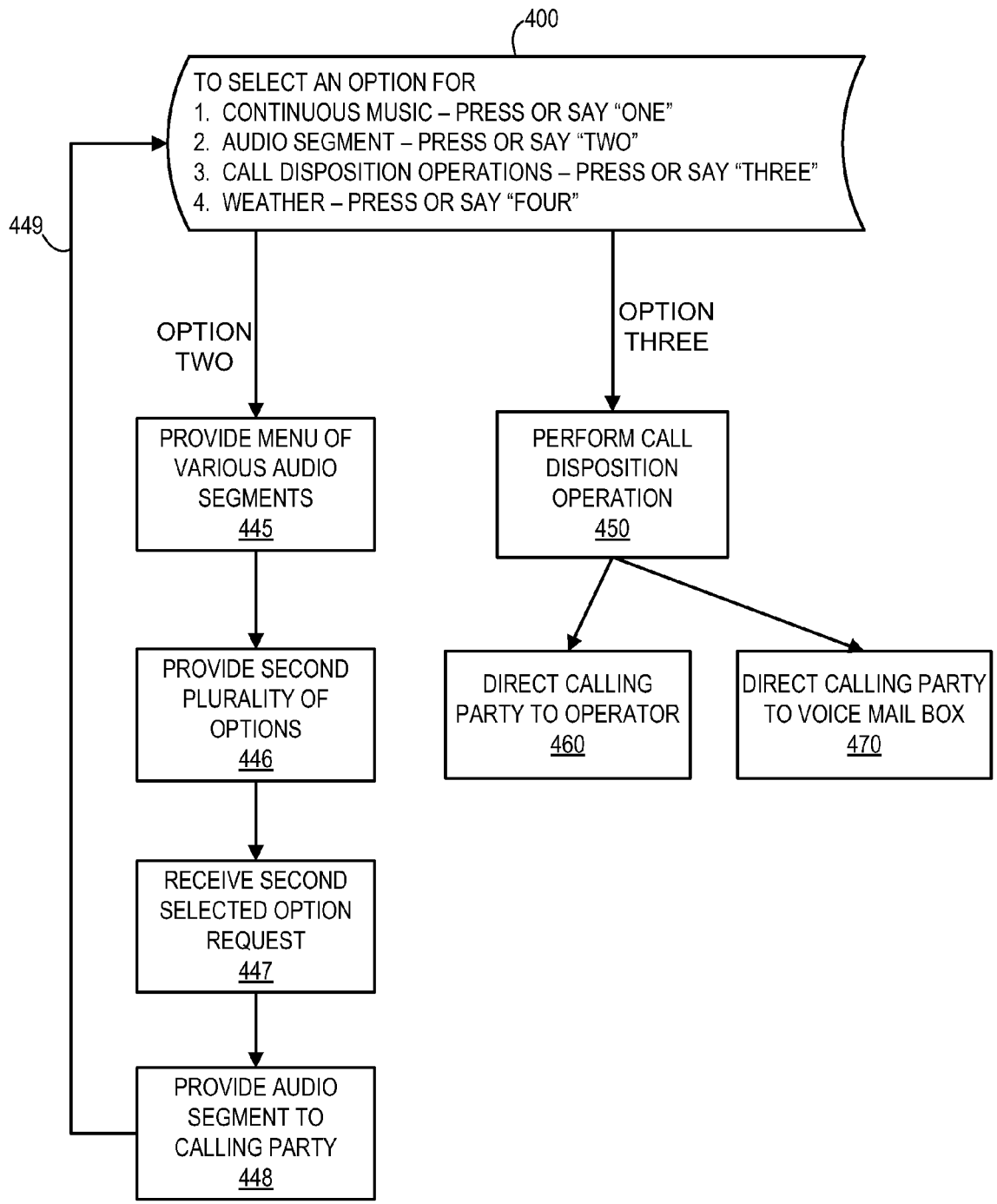

FIGS. 4A and 4B are flowcharts of a preferred embodiment of a method according to the invention. After the calling party is placed on hold, the called party's telephone system presents the on-hold calling party with one or more selectable options at step 400. As shown, the selectable options menu can enable the user to continuously listen to music, to listen to an audio segment, to perform call disposition operations, or to listen to audio segments that require data to be inputted, such as local weather information.

If, at step 400, the calling party chooses option one, the called party provides the calling party, at step 405, with continuous audio until the calling party is removed from hold.

If, at step 400, the calling party chooses option 4, then the calling party is requested, at step 410, to input geographical data such as the calling party's ZIP code, for example. A local weather audio segment corresponding to the entered ZIP code is retrieved at step 420, and provided to the calling party at step 430. After the local weather audio segment is completed, the calling party is, at step 440, returned to the original selectable options menu, from which the calling party can select another option.

If, at step 400, the calling party chooses option two, then, at step 445, the called party may provide a second options menu that lists selectable options corresponding to audio segments. As described above, the various audio segments can include musical songs, current event information, or the like. The called party then receives a second selected option request corresponding to one of the second plurality of options at step 447 and provides the selected audio segment to the calling party at step 448. After the audio segment is complete, the calling party can then return to the first menu at step 449.

If, at step 400, the calling party chooses option three, the called party performs call disposition operation for the calling party at step 450. In this regard and as described above, the calling party may be directed to an operator at step 460 or be directed to a voice mailbox at step 470.

As should now be understood, in the present invention, methods and systems are disclosed which provided selectable options to a calling party while on hold. Changes could be made to the embodiments disclosed above without departing from the broad inventive concepts thereof. For example, the present invention has been described as being implemented into an AIN-based networks, however, other advanced or intelligent networks and arrangements may be used to implement the invention. It is understood, therefore, that this invention is not limited to the particular embodiments disclosed, but it is intended to cover modifications within the scope of the present invention as defined by the appended claims.

What is claimed is:

1. A method for handling an on-hold telephone call, the method comprising:
receiving an incoming telephone call from a calling party on a first line of a called party, where the called party is an on-hold service subscriber;
placing the calling party on hold;

providing a first menu of selectable options, each associated with a first respective predefined operation, during the telephone call to the on-hold calling party, wherein the first plurality of selectable options includes an option to play a second menu of a second plurality of selectable options and an option associated with the on-hold calling party providing physical geographic location information to obtain information particular to the physical geographic location, and receiving from the on-hold calling party, a first selected option request that corresponds to one of the first plurality of selectable options; and performing the predefined operation associated with the first selected option request, wherein an option to return to the first menu is provided after receiving the first selected option request.

2. The method of claim 1,
wherein receiving the first selected option request comprises receiving from the on-hold calling party a voice command associated with the selected option.

3. The method of claim 1,
wherein receiving the first selected option request comprises receiving from the on-hold calling party an electrical signal associated with the selected option.

4. The method of claim 1,
wherein the predefined operations include communicating with an operator.

5. The method of claim 1,
wherein the predefined operations include recording a voice message.

6. The method of claim 1,
wherein the predefined operations include retrieving and playing a specified audio signal.

7. The method of claim 1,
wherein the predefined operations include connecting to an interne website; and
retrieving an audio file associated with the first selected option request.

8. The method of claim 6,
wherein the specified audio signal is a particular song.

9. The method of claim 1, further comprising:
providing to the calling party the second menu of the second plurality of selectable options, wherein each of the second plurality of selectable options is associated with a second respective predefined operation;
receiving from the calling party, a second selected option request that corresponds to one of the second plurality of selectable options; and
performing the predefined operation associated with the second selected option request.

10. An apparatus associated with the telephone network of a called party for handling an on-hold incoming call, the apparatus comprising:
a hold platform that receives a call from a calling party and places the calling party on hold after connecting the incoming call to a telephone of a called party;
a hold manager in communication with the hold platform, the hold manager providing a first menu of a first plurality of selectable options during the connected call to the on-hold calling party and receiving from the on-hold calling party a first selected option request that corresponds to one of the first plurality of selectable options provided, wherein the first plurality of selectable options includes an option to play a second menu of a second plurality of selectable options and an option associated with the on-hold calling party providing physical geographic location information to obtain information particular to the physical geographic location; and an operations manager, the operations manager performing a predefined operation associated with the first selected option request,
wherein an option to return to the first menu is provided after receiving the first selected option request.

11. The apparatus of claim 10, further comprising:
a data store in communication with the hold manager for storing the first plurality of selectable options and the second plurality of selectable options, wherein the data store contains at least one audio file associated with at least one of the first plurality of selectable options.

12. The apparatus of claim 11,
wherein the at least one audio file comprises an audio segment.

13. The apparatus of claim 11,
wherein the at least one audio file comprises a continuous audio segment.

14. The apparatus of claim 11,
wherein the at least one audio file initiates an audio stream.

15. The apparatus of claim 10,
wherein the first plurality of selectable options includes establishing communication with an operator.

16. The apparatus of claim 10,
wherein the first plurality of selectable options includes leaving a voice mail.

17. The apparatus of claim 10,
wherein a predefined operation causes the operations manager to connect to an internet website; and
retrieve an audio file associated with the first selected option request.

18. A tangible non-transitory computer-readable medium having computer-executable instructions for performing acts providing an on-hold call service where the service subscriber is a called party, comprising the acts operative to:
receive an incoming telephone call from the calling party on a first line of the called party;
place the calling party on hold;
provide a menu of a first plurality of selectable options, each associated with a respective predefined operation, during the telephone call to the on-hold calling party, wherein the first plurality of selectable options includes an option to play a second menu of a second plurality of selectable options and an option associated with the on-hold calling party providing physical geographic location information to obtain information particular to the physical geographic location;
receive from the on-hold calling party, a first selected option request that corresponds to one of the first plurality of selectable options; and
perform the predefined operation associated with the first selected option request,
wherein an option to return to the first menu is provided after receiving the first selected option request.

19. The tangible non-transitory computer readable medium of claim 18, further comprising the acts operative to:
provide to the calling party a second plurality of selectable options, wherein each of the second plurality of selectable options is associated with a respective predefined operation;
receive from the calling party, a second selected option request that corresponds to one of the second plurality of selectable options; and
perform the predefined operation associated with the second selected option request.

* * * * *

UNITED STATES PATENT AND TRADEMARK OFFICE
CERTIFICATE OF CORRECTION

| | | |
|---|---|---|
| PATENT NO. | : 8,249,240 B2 | Page 1 of 1 |
| APPLICATION NO. | : 12/202155 | |
| DATED | : August 21, 2012 | |
| INVENTOR(S) | : L. Roberts et al. | |

It is certified that error appears in the above-identified patent and that said Letters Patent is hereby corrected as shown below:

Column 9, line 36 (claim 7, line 3) "interne" should be -- internet --

Signed and Sealed this
Twenty-second Day of January, 2013

David J. Kappos
*Director of the United States Patent and Trademark Office*